United States Patent
Puniello et al.

(10) Patent No.: US 6,866,802 B2
(45) Date of Patent: Mar. 15, 2005

(54) METHOD OF FORMING GOLF BALLS FROM SURFACE-ROUGHENED MOLDS

(75) Inventors: Paul A. Puniello, Bristol, RI (US); Robert A. Wilson, Sagamore, MA (US)

(73) Assignee: Acushnet Company, Fairhaven, MA (US)

( * ) Notice: Subject to any disclaimer, the term of this patent is extended or adjusted under 35 U.S.C. 154(b) by 331 days.

(21) Appl. No.: 10/011,791

(22) Filed: Dec. 4, 2001

(65) Prior Publication Data

US 2003/0102595 A1 Jun. 5, 2003

(51) Int. Cl.[7] .............................................. B29C 45/14
(52) U.S. Cl. ...................... 264/39; 264/219; 264/275; 264/279.1; 264/328.1; 425/116; 425/812
(58) Field of Search ............... 264/39, 162, 220, 264/219, 279.1, 275, 328.1; 425/116, 812

(56) References Cited

U.S. PATENT DOCUMENTS

| | | | |
|---|---|---|---|
| 3,765,923 A | 10/1973 | Bender-Christensen | 117/26 |
| 3,840,239 A * | 10/1974 | Fazekas et al. | 277/644 |
| 3,982,983 A | 9/1976 | Abraham et al. | 156/154 |
| 4,533,568 A | 8/1985 | McClinton et al. | 427/135 |
| 4,763,900 A * | 8/1988 | Carr | 473/457 |
| 4,851,913 A | 7/1989 | Fetzer et al. | 358/206 |
| 5,318,091 A | 6/1994 | Pavoni et al. | 164/6 |
| 5,827,567 A | 10/1998 | Molitor | 427/135 |
| 6,003,724 A | 12/1999 | Collins et al. | 221/154 |
| 6,033,724 A | 3/2000 | Molitor | 427/135 |
| 6,103,166 A * | 8/2000 | Boehm et al. | 264/250 |
| 6,228,294 B1 | 5/2001 | Lee et al. | 264/39 |
| 6,235,230 B1 | 5/2001 | Puniello | 264/278 |
| 6,630,225 B2 * | 10/2003 | Sumi et al. | 428/141 |
| 6,761,846 B2 * | 7/2004 | Murphy | 264/219 |

* cited by examiner

*Primary Examiner*—Edmund H. Lee

(57) ABSTRACT

A method of forming a golf ball including the steps of forming a mold cavity; roughening the surface of the mold cavity to an average roughness of about 10 to about 200 microinches; and forming a golf ball component in the roughened cavity.

19 Claims, 3 Drawing Sheets

METHOD OF FORMING GOLF BALLS FROM SURFACE-ROUGHENED MOLDS

FIELD OF THE INVENTION

This invention relates generally to the manufacture of golf balls, and more particularly, to a method for preparing golf ball molds used during golf ball manufacturing.

BACKGROUND OF THE INVENTION

Golf ball covers can be made by injection molding thermoplastic cover material about a core. It is standard practice in injection molding to provide a mold having two cavities, each having hemispherical surfaces that mate when the mold is closed. At the initial stage of the covering process, the core of the golf ball is supported centrally within the cavities by retractable pins or the like so as to leave a space for molding the cover about the core. A thermoplastic cover material is then injected into the mold cavity through a plurality of gates. Flow of the cover material from each of the plurality of gates eventually joins to fill the void between the golf ball core and the mold. Once the void is nearly filled, but before the cover material has completely hardened, the pins holding the core retract so that the cover material may fill the voids left by the pins. The cover material then cools and hardens to form the cover.

Referring to FIG. 1, golf ball 10 includes a spherical outer surface 12 with a plurality of dimples 14 formed thereon. Dimples 14 are circular depressions that influence the ball's flight Golf ball 10 also includes knit lines 16. Knit lines 16 are formed where the flow fronts of cover material from separate gates meet. This meeting point can be referred to as a flow terminus. The knit lines are areas where the cover material's tensile strength maybe substantially reduced, and knit lines usually are masked by finishing processes. As a result of the decreased strength and cosmetic appearance, knit lines are undesirable.

In an effort to reduce the occurrence of knit lines, manufacturers have prepared molds in various ways. For example, one industry standard for making retractable pin injection molds includes first producing a hob that is formed in a lathe with a single point tool. The tool leaves radial marks or grooves on the surface of the hob. The surface of the hob is usually ground or polished to reduce the appearance of the tool marks. The hob is forced into a piece of stock to form the mold cavity and the resulting mold cavity is ground and/or polished to have a smooth appearance with a low average surface roughness of less than 10 microinches. Golf balls produced by such molds, however, have an undesirably high occurrence of knit lines.

U.S. Pat. Nos. 5,827,567 and 6,003,724 disclose other golf or game ball mold preparation techniques. These techniques include contacting a mold cavity with an abrasive media until substantially all of any previous coating has been removed and blasting the mold with aluminum oxide powder. These techniques prepare the mold to accept a mold release coating, which is subsequently applied to the mold cavity to fill any voids created by the blasting. These techniques have several drawbacks. First, masking may be necessary to keep coating off particular areas of the mold, such as pin holes. Masking is labor intensive. In addition, adding coating adds costs and the coating must be periodically checked and reapplied to be effective.

Injection molds may also have venting problems. Usually, such molds include a vent located at or near the intersection 18 of the knit lines 16, as shown in FIG. 1, so that trapped air and gasses at the flow terminus can be released through the vent. When the flow from the gates is unbalanced, the flow terminus is not near the vent, and the trapped air and gasses cannot evacuate the cavity effectively. This can cause voids in the cover in one location and cause excess material in another location, which can decrease the cover strength and/or increase the need for post-mold finishing.

One way to address unbalanced fill caused by the location and geometry of the gates is to modify the size of each gate manually using a file or the like. This solution, however, is labor intensive and its proper execution requires a great deal of skill and experience. Furthermore, such a balancing increases in difficulty as the number of cavities in the mold increase. When the mold is used with different products whose cavity size and injection moldable material may vary from that used during manual adjustment, placing new cavities in the mold may require additional adjustments, which is undesirable. In order to periodically service the cavities, they are typically removed from the mold. If the cavities are removed after manual adjustment, they may have to be returned to the same mold and same exact location in the mold to maintain the balance. This can be difficult to accomplish from a tool management perspective.

Therefore, there exists a need for a method of preparing golf ball molds for injecting molding which reduces or substantially eliminates the occurrence of knit lines, thereby increasing the durability of the golf ball cover and extending the useful life of the golf ball, without requiring manual adjustment of the gates in the mold and without significantly effecting dimples geometry or the ball finish.

SUMMARY OF THE INVENTION

The present invention is directed to a method of preparing a golf ball a method of forming a golf ball comprising forming a mold cavity; roughening the surface of the mold cavity to an average roughness of about 10 to about 200 microinches; and forming a golf ball component in the roughened cavity. The average roughness of the surface may also be between about 25 and about 100 microinches or, preferably, between about 35 and about 50 microinches.

The cavity can be roughened electrically, mechanically, or chemically, including by sand blasting or chemical etching. Typically the roughening includes directing an abrasive agent into contact with the surface. This may be accomplished by either a carrier gas or by a carrier liquid. The abrasive agent typically has a grit size between about 10 and about 200 $\mu$m, more preferably between about 75 and about 200 $\mu$m, and most preferably between about 90 and about 100 $\mu$m. The abrasive agent can include metal, metal alloys, minerals, sand, ceramic, or a mixture thereof. Preferably, the abrasive agent includes silicon carbide, tungsten carbide, granite, boron carbide, or aluminum oxide. If desired, the abrasive agent is directed at the surface at a pressure of between about 80 and about 120 psi for a time sufficient to roughen the surface, typically between about 20 and about 60 seconds.

The golf ball components of the present invention are typically injection molded. Preferably, the golf ball components are cover layers and, more preferably, are outer cover layers.

BRIEF DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

The present invention is directed to a method of forming a golf ball that includes roughening at least one surface of a golf ball mold containing golf ball component, such as a solid center, a multi-layer core, or a fluid-filled center. The golf ball component may further include single or multiple intermediate layers. These intermediate layers can be of a molded and/or wound construction as known by those of ordinary skill in the art. The present invention is, therefore, not limited to preparing molds for any particular golf ball construction, but is preferably used for injection molding golf ball cover layers and, in particular, outer cover layers.

Figure 1:
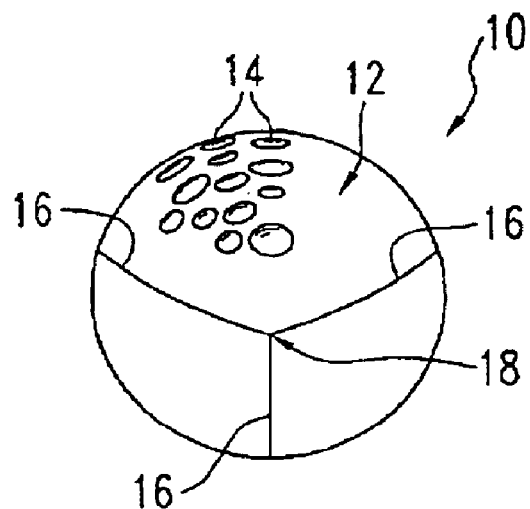
FIG. 1 is a perspective view of a prior art golf ball with knit lines.
Figure 2:
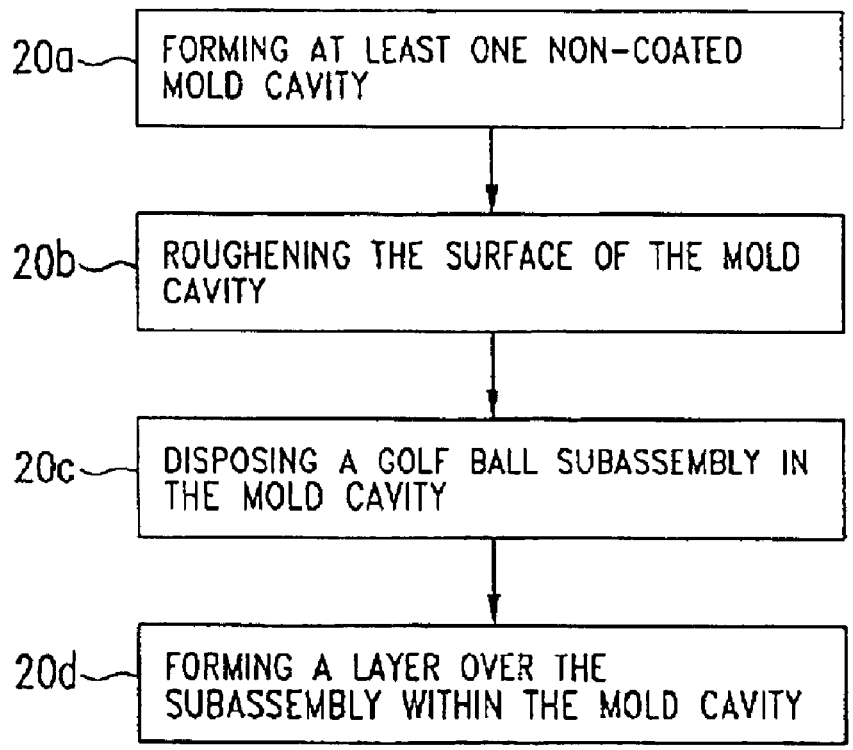
FIG. 2 is a flow chart of a method of preparing a mold according to the present invention.
Figure 3:
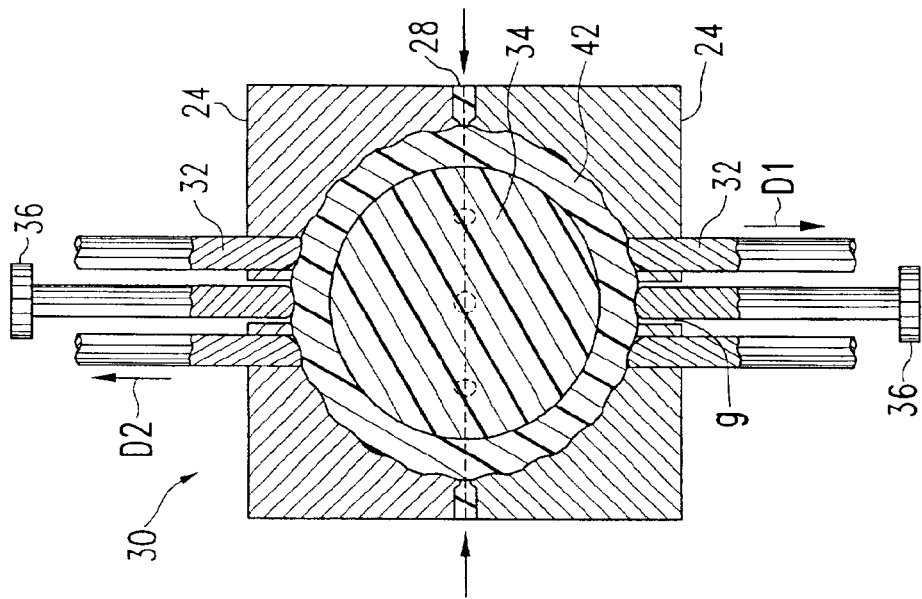
FIG. 3 is a partial, cross-sectional view of a mold prepared according to the method of the present invention, prior to forming a cover layer.

Referring to FIGS. 2 and 3, the method includes steps 20a–d. Step 20a includes forming at least one non-coated mold cavity 22 in each half-mold 24. The cavity 22 includes an outer surface 26. When the half-molds 24 are closed, the surface 26 has a substantially spherical shape and dimple forming projections 27. In this embodiment, half-molds 24 include recesses 28 at the parting line that form a runner and gate system for allowing a cover material to enter the cavity 22.

The mold 30 further includes retractable elements 32 for supporting the golf ball subassembly 34 within the cavity 22 in an extended position. The mold 30 also includes vent pins 36 disposed at the poles of the golf ball subassembly 34. The mold 30 and vent pins 36 are configured and dimensioned so that a gap g exists there between which acts as a vent for gases to exit from the cavity 22 during molding. The upper ends of the vent pins 36 form a portion of the surface 26.

The mold cavity 22 can be formed by using conventional techniques such as hydro-forming or hobbing. Preferably, the mold cavity is made of stainless steel. The present invention, however, is not limited to the above forming techniques or materials.

In step 20b, the surface 26 of the mold cavity 22 is roughened. This can be accomplished by a variety of methods including but not limited to electrical, chemical, and mechanical forming methods. Any suitable method for texturing or roughening the surface is acceptable. An example of an electrical forming method is electrical-discharge machining ("EDM"). An example of a chemical forming method is chemical etching of the surface. An example of a mechanical forming method is directing an abrasive agent into contact with the surface 22. The abrasive agent should have sufficient hardness to form a pattern in the surface.

These and other suitable methods are described in standard handbooks of the trade, such as *Mechanical Engineer's Handbook* at §§31.3 to 31.6 (Myer Kutz ed. John Wiley & Sons, Inc. 1986) and *Marks' Standard Handbook for Mechanical Engineers* at §§13.4 & 13.5 (Eugene A. Avallone et al. eds., 9th ed. 1978). The degree of roughening of the pin section surface can be specified depending upon the method used to form the roughened surface. For instance, an EDM surface finish is described according to the Channilles scale. A chemical etching surface finish can be described by texture ID number or type, as provided by Mold-Tech, Inc. of Chicopee, Mass. Likewise, the textured surface made according to the mechanical process can be controlled by the grit size used in the process.

Figure 5:
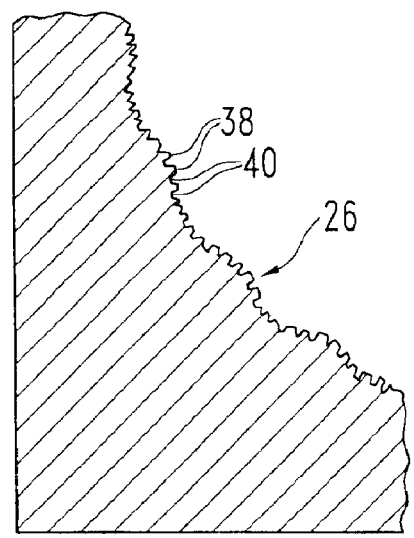
FIG. 5 is an enlarged, cross-sectional view of a portion of the mold within arrows 5—5 of FIG. 3.
Figure 6:
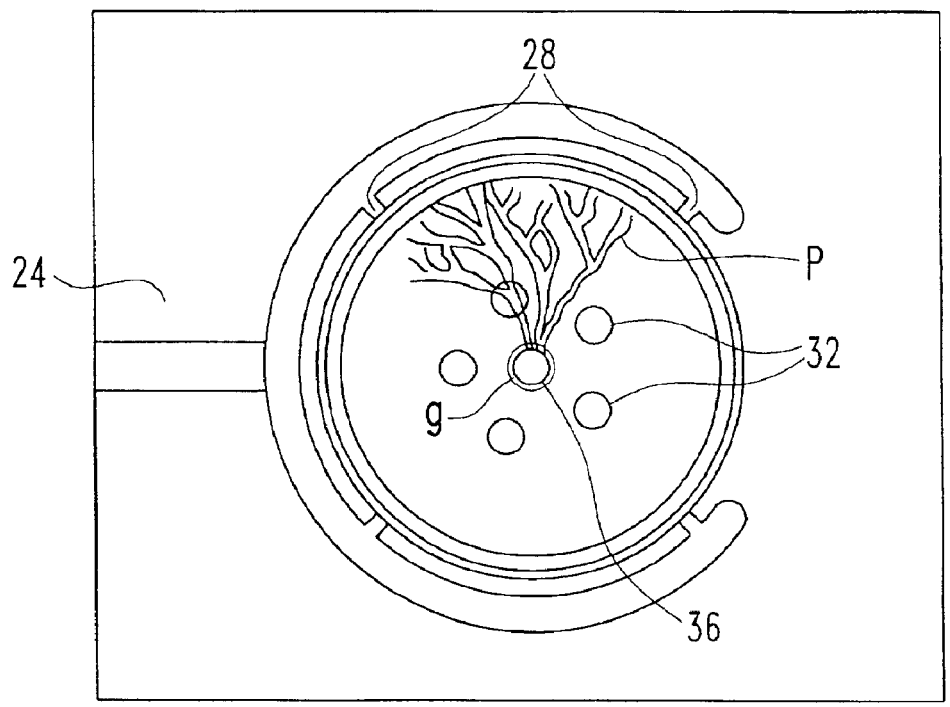
FIG. 6 is a schematic, plan view of the mold of FIG. 3 showing a pattern in the surface of the mold.

Roughening the surface 26 with the abrasive agent results in, as best seen in FIG. 5, the surface including a plurality of microscopic peaks 38 and valleys 40. The valleys 40, preferably, form a pattern of interconnected passageways P in fluid communication with the vent pin 36. The abrasive agent should be small enough so that it does not significantly alter the geometry of the dimple projections 27 (as shown in FIG. 3).

The abrasive agent can be directed in a stream of gas only, liquid only, or a gas/liquid mixture. When the abrasive agent is in gas only, it may be called "sandblasting." When the abrasive agent is in liquid, it may be called "vapor honing." Gases and liquids that can be used during this method include, for example, air and water.

The abrasive agent can be formed of metal, alloys, minerals, sand, ceramics or any natural or synthetic abrasive material with the desired grit equivalent. For example, silicon carbide, tungsten carbide, granite, aluminum oxide, and boron carbide can be used. The present invention however is not limited to these abrasive agents. The abrasive agent is selected based on the size of the particles (i.e., grit) that can be formed by the material and the hardness of the material.

The abrasive agent preferably has a grit size greater than about 800 (i.e., a diameter of about 10 microns) and less than about 70 (i.e., a diameter of about 200 microns). More preferably, the abrasive agent has a grit size between about 70 (i.e., a diameter of about 200 microns) and about 180 (i.e., a diameter of about 75 microns). Even more preferably, the abrasive agent has a grit size between about 150 (i.e., a diameter of about 90 microns) and about 120 (i.e., a diameter of about 100 microns). Most preferably, the grit size is about 120 (i.e., a diameter of about 100 microns). One of ordinary skill in the art is aware that grit size and diameter are inversely proportional, i.e., a larger grit size will yield a lower diameter, and vice versa.

The abrasive agent is preferably directed at a pressure of between about 80 and about 120 psi. The abrasive agent is preferably directed for a time of between about 20 and about 60 seconds. The time depends on the size and shape of the abrasive agent, the hardness of the agent and the material forming the mold cavity. In a preferred embodiment, the abrasive agent is 120 grit aluminum oxide sandblasted for about 20 seconds to about 30 seconds at 100 psi using a ¼-inch nozzle diameter. The sandblasting cabinet used in the preferred embodiment is commercially available from Cyclone Blasting Systems, Inc. of Dowagiac, Mich. under the designation Cyclone Model 4826. Other commercially available sandblasting cabinets can also be used.

After the abrasive agent contacts the surface of the cavity, the surface is roughened or texturized so that the average surface roughness is between about 10 and about 200 microinches. More preferably, the average surface roughness is between about 25 and about 100 microinches, still more preferably, the average surface roughness is about 35 to about 50 microinches. The surface roughness can be determined using a variety of commercially available measuring devices, such as a profilometer or an atomic force microscope. The surface roughness should be sufficiently large to create adequate passageways to accommodate the air, however, the passageways should be small enough and shaped appropriately so that the cover material cannot enter the passageways sufficiently to prevent gases from traveling on a short path from the flow terminus to the vent surrounding the vent pin 36.

As part of step 20b, after the surface is roughened the surface must be cleaned to remove the abrasive agent and any removed mold material. This cleaning should remove these materials from the cavity surface and the pin holes. Preferably, the cleaning is done by rinsing the cavities with soap and water and hand drying the cavities.

Referring to FIGS. 2 and 3 in step 20c, a golf ball subassembly 34 is disposed within the non-coated mold cavity 22. The mold cavity is non-coated because no mold release coating or other coating is applied to the surface 26 during the inventive process.

Figure 4:
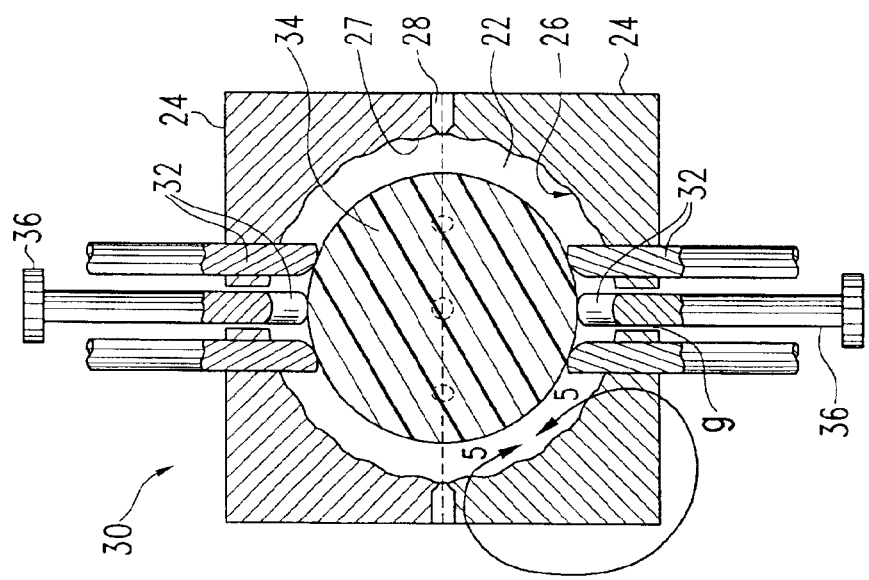
FIG. 4 is a partial, cross-sectional view of the mold of FIG. 3, after forming the cover layer.

Referring to FIGS. 2 and 4 in step 20d, a layer 42 of cover material is formed on the golf ball subassembly 34 within the mold cavity 22. During molding, the pins 32 move in the directions D1 and D2, respectively, to allow the cover material to enter the holes left by the pins before the cover material solidifies.

Referring also to FIG. 5, as the cover material flows into the cavity 22, the cover material flows on the peaks 38 of the surface 26 and not into the valleys 40 due to the surface tension of the material and the small size of the valleys 40. As a result air, which is spaced from the vent pins 36 but located where the flow fronts meet, is free to travel in the passageways P formed by valleys 40 to the vents surrounding vent pins 36. In this way, trapped air and defects resulting therefrom are minimized.

Table I shows test results comparing different mold cavity preparations or finishes. The Ra roughness measurements were made on a Dektak 303 contact stylus profilometer, in which 20-mil traces were taken using a 12.5-µm-radius stylus under a load of 15 mg. The profilometer was calibrated using a NIST traceable height standard (MRS-3 144R5).

to 45.5. Golf balls were formed using these cavities and the molded balls were inspected for knit lines. The golf balls formed with the cavities of Comparative Example 1 exhibited 39% knit lines and the golf balls formed with the cavities of inventive Example 2 exhibited 0% knit lines under 4× magnification. Thus, the present inventive Example 2 exhibits far fewer knit lines than the prior art method of Comparative Example 1. More specifically, the knit lines were eliminated in golf balls of inventive Example 2.

Comparative Example 4 is a mold treated with a 800 grit by vapor honing. The mold of Example 4 exhibited a roughness range of 4.6 to 9.0. Golf balls were formed using these cavities and the molded balls were inspected for knit lines. In inventive Example 3, the cavities of Comparative Example 4 were removed from the mold and sandblasted with 120 grit aluminum oxide for between about 20 seconds and about 30 seconds at 100 psi using a ¼-inch nozzle diameter until the entire cavity surface was covered according to the present invention. The inventive mold of Example 3 exhibited a roughness range of 31.2 to 45.5. Golf balls were formed using these cavities and the molded balls were inspected for knit lines. The golf balls formed with the cavities of Comparative Example 4 exhibited 3% knit lines and the golf balls formed with the cavities of inventive Example 3 exhibited 0% knit lines under 4× magnification. Thus, the present inventive method of Example 3 exhibits fewer knit lines than the method of Comparative Example 4. More specifically, the knit lines were eliminated in golf balls of inventive Example 3.

With the balls of inventive Examples 3 and 4, tests related to the dimple geometry were also conducted. The dimple edge angle for balls from processes of Examples 3 and 4 are substantially the same at 16.6° and 16.7°. The dimple diameter for balls from processes of Examples 3 and 4 were substantially the same at 0.1438 inches and 0.1447 inches, respectively, and the dimple depths for balls from processes of Examples 3 and 4 were the same at 0.0107 inches each. Thus, the inventive process of Example 3 and the Comparative Example 4 did not significantly affect dimple geometry.

Not only does the present method allow improved venting without knit line formation but may also allow the same

TABLE I

| Factor | Comparative Example 1 | Example 2 | Example 3 | Comparative Example 4 |
| --- | --- | --- | --- | --- |
| Cavity Finish | As hobbed | 120 Grit Sandblasted | 120 Grit Sandblasted | 800 Grit Vapor Honed |
| Roughness Range | 2.3–8.2 | 31.2–45.5 | 31.2–45.5 | 4.6–9.0 |
| Percent Knit Lines at the Poles | 39% | 0% | 0% | 3% |
| Dimple Edge Angle | — | — | 16.6° | 16.7° |
| Dimple Diameter | — | — | 0.1438 in. | 0.1447 in. |
| Dimple Depth | — | — | 0.0107 in. | 0.0107 in. |

Comparative Example 1 is a mold formed by a hob that was turned, then polished to a finish. This mold exhibited a roughness range less than 10 of from 2.3 to 8.2. Golf balls were formed using this mold and the molded balls were inspected for knit lines. In Example 2, the cavities in the mold of Comparative Example 1 were removed from the mold and sandblasted with 120 grit aluminum oxide for between about 20 seconds and about 30 seconds at 100 psi using a ¼-inch nozzle diameter until the entire cavity surface was covered according to the present invention. The inventive mold of Example 2 exhibited a roughness range of 31.2 cavities to run different core sizes and cover formulations in the same mold. It also eliminates the need for manual adjustment of gate size to assure that the flow terminus meet at the vent pin locations, which in turn allows the cavities to be fabricated identically and interchanged in different mold bases and have interchanged locations in a base.

As used herein, the term "about," used in connection with one or more numbers or numerical ranges, should be understood to refer to all such numbers, including all numbers in a range.

While it is apparent that the illustrative embodiments of the invention disclosed herein fulfill the objectives stated above, it is appreciated that numerous modifications and other embodiments may be devised by those skilled in the art. Although the inventive preparation is applied to a mold used to form an outer cover layer, the inventive preparation can be done on a mold used to form various other layers, such as an inner cover layer. Therefore, it will be understood that the appended claims are intended to cover all such modifications and embodiments which would come within the spirit and scope of the present invention.

What is claimed is:

1. A method of forming a golf ball comprising:

forming a non-coated mold cavity;

providing within the mold cavity a vent pin and a vent surrounding the vent pin;

roughening the surface of the mold cavity to an average roughness of about 10 to about 200 microinches to form peaks and valleys wherein the valleys form a pattern of interconnected passageways in fluid communications with the vent pin wherein the roughness is sufficiently large enough to create adequate passageways to accommodate an air flow, yet small enough and shaped appropriately so that a cover material cannot enter the passageways sufficiently to prevent gases from traveling on a short path from a flow terminus to the vent surrounding the vent pin; and removing any abrasive agent or removed mold material from the roughened surface of the mold cavity;

forming a golf ball component in the roughened non-coated cavity.

2. The method of claim 1, wherein the step of roughening the surface further includes increasing an average roughness of the surface to between about 25 and about 100 microinches.

3. The method of claim 2, wherein the step of roughening the surface further includes increasing an average roughness of the surface to between about 35 and about 50 microinches.

4. The method of claim 3, wherein the cavity is roughened electrically, mechanically, or chemically.

5. The method of claim 1, wherein the cavity is roughened by sand blasting.

6. The method of claim 1, wherein the cavity is roughened by chemical etching.

7. The method of claim 1, wherein the roughening includes directing an abrasive agent into contact with the surface.

8. The method of claim 7, wherein the abrasive agent is carried by a gas into contact with the surface.

9. The method of claim 7, wherein the abrasive agent is carried by a liquid into contact with the surface.

10. The method of claim 7, wherein the abrasive agent has a grit size between about 10 and about 200 $\mu$m.

11. The method of claim 10, wherein the abrasive agent has a grit size between about 75 and about 200 $\mu$m.

12. The method of claim 11, wherein the abrasive agent has a grit size between about 90 and about 100 $\mu$m.

13. The method of claim 7, wherein the abrasive agent comprises metal, metal alloys, minerals, sand, or ceramic.

14. The method of claim 13, wherein the abrasive agent comprises silicon carbide, tungsten carbide, granite, boron carbide, or aluminum oxide.

15. The method of claim 7, wherein the abrasive agent is directed at the surface at a pressure of between about 80 and about 120 psi for a time sufficient to roughen the surface.

16. The method of claim 15, wherein the abrasive agent is directed at the surface for a time of between about 20 and about 60 seconds.

17. The method of claim 1, wherein the golf ball component is injection molded.

18. The method of claim 1, wherein the golf ball component is a cover layer.

19. The method of claim 18, wherein the golf ball component is an outer cover layer.

* * * * *